(12) United States Patent
Loeb et al.

(10) Patent No.: US 7,475,028 B2
(45) Date of Patent: *Jan. 6, 2009

(54) METHOD AND APPARATUS FOR PROVIDING OPEN-ENDED SUBSCRIPTIONS TO COMMODITY ITEMS NORMALLY AVAILABLE ONLY THROUGH TERM-BASED SUBSCRIPTIONS

(75) Inventors: Michael R. Loeb, Darien, CT (US); Jay S. Walker, Ridgefield, CT (US)

(73) Assignee: Synapse Group, Inc., Stamford, CT (US)

( * ) Notice: Subject to any disclaimer, the term of this patent is extended or adjusted under 35 U.S.C. 154(b) by 390 days.

This patent is subject to a terminal disclaimer.

(21) Appl. No.: 11/022,304

(22) Filed: Dec. 23, 2004

(65) Prior Publication Data

US 2006/0178939 A1  Aug. 10, 2006

Related U.S. Application Data

(63) Continuation of application No. 09/940,062, filed on Aug. 27, 2001, now abandoned, which is a continuation of application No. 09/370,290, filed on Aug. 9, 1999, now abandoned, which is a continuation of application No. 08/762,007, filed on Dec. 11, 1996, now Pat. No. 6,014,641.

(51) Int. Cl.
*G06Q 30/00* (2006.01)
(52) U.S. Cl. .......................................... 705/26; 705/14
(58) Field of Classification Search ................. None
See application file for complete search history.

(56) References Cited

U.S. PATENT DOCUMENTS

| | | | |
|---|---|---|---|
| 4,799,156 A | 1/1989 | Shavit et al. | |
| 5,168,445 A | 12/1992 | Kawashima et al. | |
| 5,319,542 A | 6/1994 | King, Jr. et al. | |
| 5,475,585 A | 12/1995 | Bush | |
| 5,483,445 A | 1/1996 | Pickering | |
| 5,521,966 A | 5/1996 | Friedes et al. | |
| 5,592,375 A | 1/1997 | Salmon et al. | |
| 5,781,911 A * | 7/1998 | Young et al. | 707/201 |
| 5,850,520 A | 12/1998 | Griebenow et al. | |
| 5,903,877 A | 5/1999 | Berkowitz et al. | |
| 5,995,092 A | 11/1999 | Yuen et al. | |
| 6,014,641 A | 1/2000 | Loeb et al. | |

OTHER PUBLICATIONS

"Make the library connection" by Eric Bryant, from Folio: The magazine for Magazine Management, Mar. 1, 1994.*
Bryant, Eric, "Make the library connection", Folio: The Magazine for Magazine Management, Mar. 1994, vol. 23, No. 4, pp. 33-34.
William H. Huff, "Serial Subscription Agencies", Library Trends, Apr. 1976, vol. 24, No. 4, pp. 683-709.
Jennifer Howland, "National Distributors: Scanning the Future", Folio Magazine, Feb. 1985, p. 69.

(Continued)

Primary Examiner—F. Zeender
Assistant Examiner—Luna Champagne
(74) Attorney, Agent, or Firm—Edwards Angell Palmer & Dodge LLP

(57) ABSTRACT

A system for providing an open-ended subscription to commodity items normally available on a term basis includes a central agent that serves as the front-end for commodity suppliers. This central agent maintains databases containing information associated with a group of commodity items and their sales. Using these databases, the central agent produces subscription records to provide open-ended subscription services to its customers, while supporting the term-based subscriptions of the commodity suppliers.

7 Claims, 13 Drawing Sheets

OTHER PUBLICATIONS

Wally Wood, "Circulation Marketing: Let Your Magazine Do the Selling", Folio Magazine, Jun. 1985, at p. 78.

Folio: The Magazine for Magazine for Magazine Management, "Titles Turn to Credit Card Billing", Jan. 1, 1991, vol. 20, No. 1, ISSN: 0046-4333, pp. 21.

Scott Donaton, "Magazines Set to Test Automatic Renewals", Advertising Age, Jan. 7, 1991, News Section, pp. 6.

John Masterton, "Titles Turn to Credit Card Billing to Boost Renewals; Circulation Insider", Target Marketing, Feb. 1991, vol. 14, No. 2, ISSN: 0889-5333, pp. C2.

Tony Silber, "No Automatic Acceptance for Autorenew; Periodical Subscription; Update", Folio The Magazine for Magazine Management, May 1, 1991, vol. 20, No. 5, ISSN: 0046 4333, pp. 13.

Direct, "Titles Turn To Credit Card Billing To Boost Renewals," Feb. 1991, vol. 3, No. 2, p. 16, ISSN: 1046-4174.

* cited by examiner

| ORDER ID | CUSTOMER INFORMATION: NAME, ADDRESS, ETC. | DATE OF ORDER | CREDIT CARD: NUMBER, EXPIRATION DATE, NAME ON CARD | PAYMENT FREQUENCY | NEXT PAYMENT DATE | MAGAZINE ID ORDERED | PUBLISHER TERM EXPIRATION DATE | STATUS: ACTIVE OR CANCELED | SALES TERMS |
|---|---|---|---|---|---|---|---|---|---|
| 1247002 | J.SMITH #1 OSLOW RD. STAMFORD, CT | 10/15/96 | 1234-5678-4321-8765, 9/99, J.SMITH | 6 MONTHS | 4/15/96 | TIM-247 | 10/15/97 | ACTIVE | FULL REFUND |

| MAGAZINE ID | MAGAZINE NAME | PUBLISHER ID | PUBLISHER TERM INFORMATION | CONSUMER RATE FOR TERM | AGENT RATE FOR TERM | MAGAZINE DISTRIBUTION FREQUENCY |
|---|---|---|---|---|---|---|
| TIM 247 | TIME | TIM 001 | 12 MONTHS | $36.00 | $18.00 | 52 |
| PCM 125 | PC MAGAZINE | ZIF 002 | 12 MONTHS | $12.00 | $6.00 | 12 |
| | | | | | | |
| | | | | | | |
| | | | | | | |

| PUBLISHER ID | PUBLISHER NAME | PUBLISHER INFORMATION: CONTACT, ADDRESS, PHONE, ETC. | PUBLISHER SUBSCRIPTION DATA FORMAT | LIST OF MAGAZINE IDS PUBLISHED | MAGAZINE CANCELLATION DATA FORMAT |
|---|---|---|---|---|---|
| TIM 001 | TIME, INC. | SUE THOMAS 5 PARK AVE. NEW YORK, NY | TIME ORDER FMT | TIM 247 SIP 126, ETC. | TIME CANCEL FMT |
| | | | | | |
| | | | | | |
| | | | | | |
| | | | | | |

METHOD AND APPARATUS FOR PROVIDING OPEN-ENDED SUBSCRIPTIONS TO COMMODITY ITEMS NORMALLY AVAILABLE ONLY THROUGH TERM-BASED SUBSCRIPTIONS

CROSS-REFERENCE TO RELATED APPLICATIONS

This application is a continuation of U.S. patent application Ser. No. 09/940,062 filed Aug. 27, 2001, now abandoned, which is a continuation of U.S. patent application Ser. No. 09/370,290 filed Aug. 9, 1999, now abandoned, which is a continuation of U.S. patent application Ser. No. 08/762,007 filed Dec. 11, 1996, now U.S. Pat. No. 6,014,641 issued Jan. 11, 2000, each of which is hereby incorporated by reference in its entirety.

BACKGROUND OF THE INVENTION

1. Field of the Invention

The present invention relates generally to subscription services. More particularly, the invention relates to a method and apparatus for providing open-ended availability to commodity items, such as magazines, normally available to consumers only through renewable term-based subscriptions.

2. Description of the Related Art

Most periodicals, such as newspapers and magazines, are available to consumers through subscriptions. Such subscriptions allow consumers to receive delivery of the periodicals at home. Subscriptions available for newspapers, however, differ from subscriptions available for magazines in at least one respect. Newspaper subscriptions are typically available on a continuous, or open-ended basis, where the subscriptions do not expire simply because a period of time, or term, has elapsed. Rather, newspaper subscriptions terminate only after subscribers contact the newspaper publisher and cancel the subscriptions. In the context of subscriptions, the term "open-ended" refers to subscriptions of indefinite duration, subject only to the subscriptions being canceled.

By contrast, magazine subscriptions involve consumers contracting with magazine publishers to pay for and receive magazines for fixed periods of time, or terms (i.e., 1 year). These magazine subscriptions expire only after their respective-terms have elapsed. Until then, subscribers are committed to receive the magazines for the entire length of the subscription term. Some costumers may never subscribe to magazines simply because they are unwilling to commit themselves to buying magazines that they may not want to receive in the future.

If magazine subscribers want to continue to receive magazines without disruption, they must renew their subscriptions before they expire. The process of renewing subscriptions traditionally involves two basic stages. First, magazine publishers phone or mail renewal notices to subscribers as subscriptions approach the end of their terms. Mailed renewal notices often comprise letters requesting subscribers to contract to purchase magazines for another term. Subscribers who desire to renew must provide renewal instructions by, for example, filling out the renewal notice form and mailing it back to the magazine publisher. Subscribers may choose to pay the renewal cost at the time of renewal. If not, magazine publishers send invoices to the subscribers returning renewal instructions. The subscribers receiving the invoices must write out checks for the invoice and send them back to the publishers to complete the renewal process. Alternatively, credit card accounts may be used to pay for renewals.

Such a renewal process, however, inherently discourages subscribers from renewing their subscriptions. Under this process, all subscribers desiring continued receipt of a magazine title receive renewal notices and provide renewal instructions near the end of every subscription term (e.g., every year).

This not only presents needless inconvenience to those subscribers, but also forces subscribers to periodically reconsider and reevaluate whether the value imparted by the subscriptions justify their expense.

In addition, publishers usually mail out multiple renewal notices, sometimes up to fifteen, to their subscribers. In some cases, supplemental renewal notices from publishers may cross in the mail with renewal instructions from subscribers. Subscribers receiving these supplemental renewal notices may be uncertain as to whether the publishers received their renewal instructions or whether the subscribers even submitted the instructions. As a result, some subscribers may inadvertently return two (or more) sets of renewal instructions. Also, inadvertent failure to return renewal instructions in a timely fashion may result in sudden, and in some cases unnoticed, disruptions in subscription services. Thus, the traditional renewal process is fraught with problems.

Attempts have been made to address the shortcomings of the traditional renewal process. One attempt involved requiring subscribers to agree so automatic renewal of their subscriptions, unless they notified the publishers otherwise. Under this automatic renewal process, publishers sent invoices near the end of subscription terms without ever sending renewal notices. Subscribers desiring to terminate their subscriptions returned their invoices with the word "canceled" written on them without enclosing payment. Publishers receiving such invoices processed those subscriptions as canceled. Those subscribers who desired to continue subscription services returned the invoice along with payment for the subscriptions. One magazine publisher, the American Express Publishing Company (AEPC) implemented an automatic subscription renewal system. AEPC required that, in subscribing to its magazines, subscribers must not only agree to automatic 1-year subscription renewals, but also agree to charge payment for the renewals on the subscribers' American Express card.

Such automatic renewal systems suffered their own drawbacks. Publishers adopting automatic subscription renewal systems usually imposed automatic renewal as a nonoptional condition to magazine subscriptions. Subscribers often did not even realize that they had to affirmatively cancel their subscriptions to avoid renewal. This was confusing to unwitting subscribers wishing to discontinue receipt of magazines once their subscription terms had ended.

Automatic renewal systems suffered yet other problems and limitations, including the limitation that only very limited selections of magazines could be sold on such a basis. Since automatic renewal was practiced by a publisher, choices were limited to those titles available from the publisher. Further, the nature of the transaction often required the buyer to commit to undetermined, future price increases to be determine unilaterally by the publisher.

Yet other systems required buyers to prepay for multi-year subscriptions. As with the automatic renewal systems noted above, such pre-paid systems provided the buyers little flexibility in payment and cancellation options, and small selections of magazines.

Thus, both traditional and automatic subscription renewal systems give rise to unsatisfactory shortcomings and complications that discourage consumers from wanting to subscribe to magazines.

SUMMARY OF INVENTION

Accordingly, the present invention is directed to a method and apparatus that substantially obviates one or more of the problems due to limitations, shortcomings, and disadvantages of the related art.

One advantage of the invention is that consumers are empowered to obtain open-ended subscriptions to commodity items, such as magazines, normally only available to consumers through renewable term-based subscriptions.

Another advantage is that subscription renewal notices, and associated billings, are eliminated without requiring automatic renewal of a term-based subscription.

Yet another advantage is that the inherent risk that magazine subscriptions will be disrupted because the magazine publisher did not receive renewal instructions or payment is avoided.

Still another advantage is that subscribers can have the flexibility to cancel subscriptions at any time, and not only when a subscription term has elapsed.

A further advantage is that a wide selection of magazines can be provided under a continuous service program.

To achieve these and other advantages, one aspect of the invention includes a system for managing subscriptions to commodity items, comprising a device for receiving customer orders for open-ended subscriptions to the commodity items, a device for storing the received customer orders, a device for generating supplier orders for renewable term subscriptions to the commodity items based upon the stored customer orders, and a device for transmitting the supplier orders to respective suppliers of the commodity items.

In another aspect, the invention includes a system for providing open-ended subscriptions to commodity items, comprising a first database storing customer orders for open-ended subscriptions to the commodity items, a second database storing information relating to renewable term subscriptions through which the commodity items are available from respective suppliers; and a device for correlating the customers orders in the first database with information stored in the second database and for generating supplier orders for renewable term subscriptions to the commodity items based upon the correlation.

Additional aspects of the invention are disclosed and defined by the appended claims. It is to be understood that both the foregoing general description and the following detailed description are exemplary and explanatory and are intended to provide further explanation of the invention as claimed.

BRIEF DESCRIPTION OF THE DRAWINGS

The accompanying drawings illustrate a preferred embodiment of the invention. The drawings are incorporated in and constitute a part of this specification.

In the drawings:

FIG. 3 illustrates a sample of the contents of the order database stored in the central agent shown in FIG. 2;

FIG. 4 illustrates a sample of the contents of the magazine database stored in the central agent shown in FIG. 2;

FIG. 5 illustrates a sample of the contents of the publisher database stored in the central agent shown in FIG. 2;

DETAILED DESCRIPTION

Introduction

The system of the invention avoids the shortcomings of prior art renewal systems by offering magazine subscriptions on an open-ended basis, thereby eliminating any need for renewals. The system interfaces magazine publishers with magazine subscribers, and takes into account the fact that magazine publishers, in practice, normally only offer magazine subscriptions to subscribers on a term (fixed period of time) basis. The system also integrates magazine publishers and magazine subscribers with a payment clearinghouse to simplify subscription payments. While the system is described in connection with magazine subscriptions, it applies to any commodity item that is normally available to consumers only through renewable term-based subscriptions.

The system of the invention includes a central agent that serves as the front-end for commodity suppliers. This central agent maintains databases and produces subscription records to provide open-ended subscription services to its customers, while supporting the term-based subscriptions of the commodity suppliers.

System of the Invention

Figure 1:
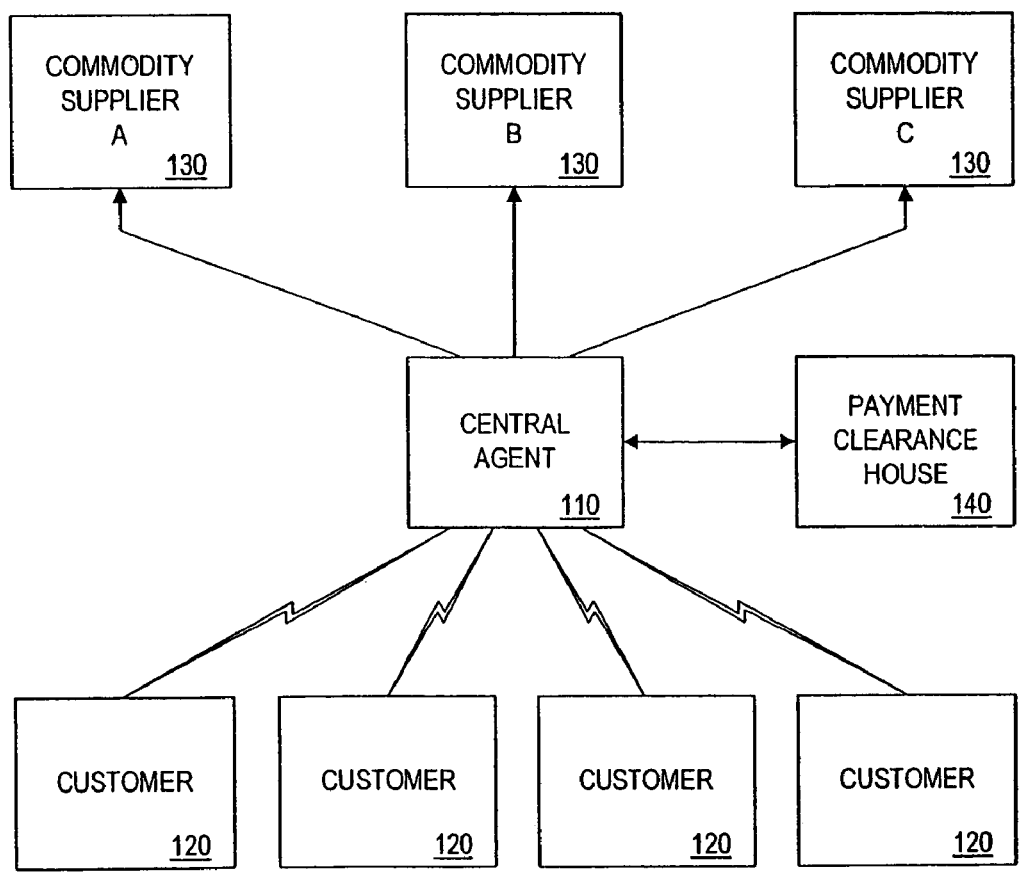
FIG. 1 illustrates a preferred embodiment of a system, according to the invention.

FIG. 1 shows one embodiment of the system according to the invention. In this embodiment, the system includes central agent 110 configured to receive data from customers 120 (magazine subscribers), transmit data to commodity suppliers 130 (magazine publishers), and authenticate customer credit card data through payment clearinghouse 140.

Agent 110 preferably comprises a processor-based system that maintains databases of information relating to magazine subscriptions. Agent 110 interfaces customers 120 with suppliers 130 to provide open-ended magazine subscriptions to customers 120. Agent 110 correlates information stored in these databases to effect the purchase of subscription items from suppliers 130 in accordance with subscription information stored in one of the databases and to effect the sale of the subscription items to customers 120 in accordance with sales information stored in another database. The structure of one embodiment of agent 110 is described below in connection with FIG. 2.

Customers 120 include parties, such as individuals-or companies, wishing to subscribe to magazines on an open-ended basis. Customers 120 order magazines through agent 110 by transmitting subscription orders specifying what magazines they wish to subscribe to. Customers 120 can transmit these subscription orders through various ways. In a preferred embodiment, customers 120 fill out paper forms specifying which magazines they wish to subscribe to and mail them to agent 110. Operators at agent 110 type or scan the subscription orders into data terminals. Two alternative ways for customers 120 to transmit subscription orders to agent 110 include customers 120 telephoning operators at agent 110 to verbally specify their subscription interests and customers 120 transmitting subscription orders electronically from a customer's data terminal to an operator's data terminal connected, for example, through a public switched telephone network or the Internet. As described in greater detail below, customers 120 sign up for open-ended magazine subscriptions through agent 120 and can cancel the subscriptions by notifying agent 110.

Commodity suppliers 130 (magazine publishers) provide commodity items, such as magazines, through term-based subscriptions. Suppliers 130 receive subscription records and payment based upon the agent rate from agent 110 and, based upon the received subscription records, deliver commodities (magazines) to customers 120 (magazine subscribers) as they otherwise would for term-based subscriptions. In a preferred embodiment, agent 110 transmits subscription and cancellation records to suppliers 130 through a public switched phone network. These subscription records preferably contain a unique code that causes suppliers 130 to suppress issuance of renewal notices so that customers 120 do not receive any renewal notices while the open-ended subscription remains active.

Payment clearinghouse 140 receives and validates customer payment for magazines. Clearinghouse 140 preferably comprises a credit card clearinghouse capable of verifying credit card status, and appropriately charging and refunding amounts to credit cards. Clearinghouse 140 receives the credit card information from agent 110 and transmits its response through secure transmission lines. In an alternative embodiment, clearinghouse 140 could authenticate charges and refunds for bank accounts. Data communicated between agent 110 and clearinghouse 140 is preferably encrypted using conventional encryption techniques to ensure that third parties cannot misappropriate any transmitted financial or credit card information.

Figure 2:
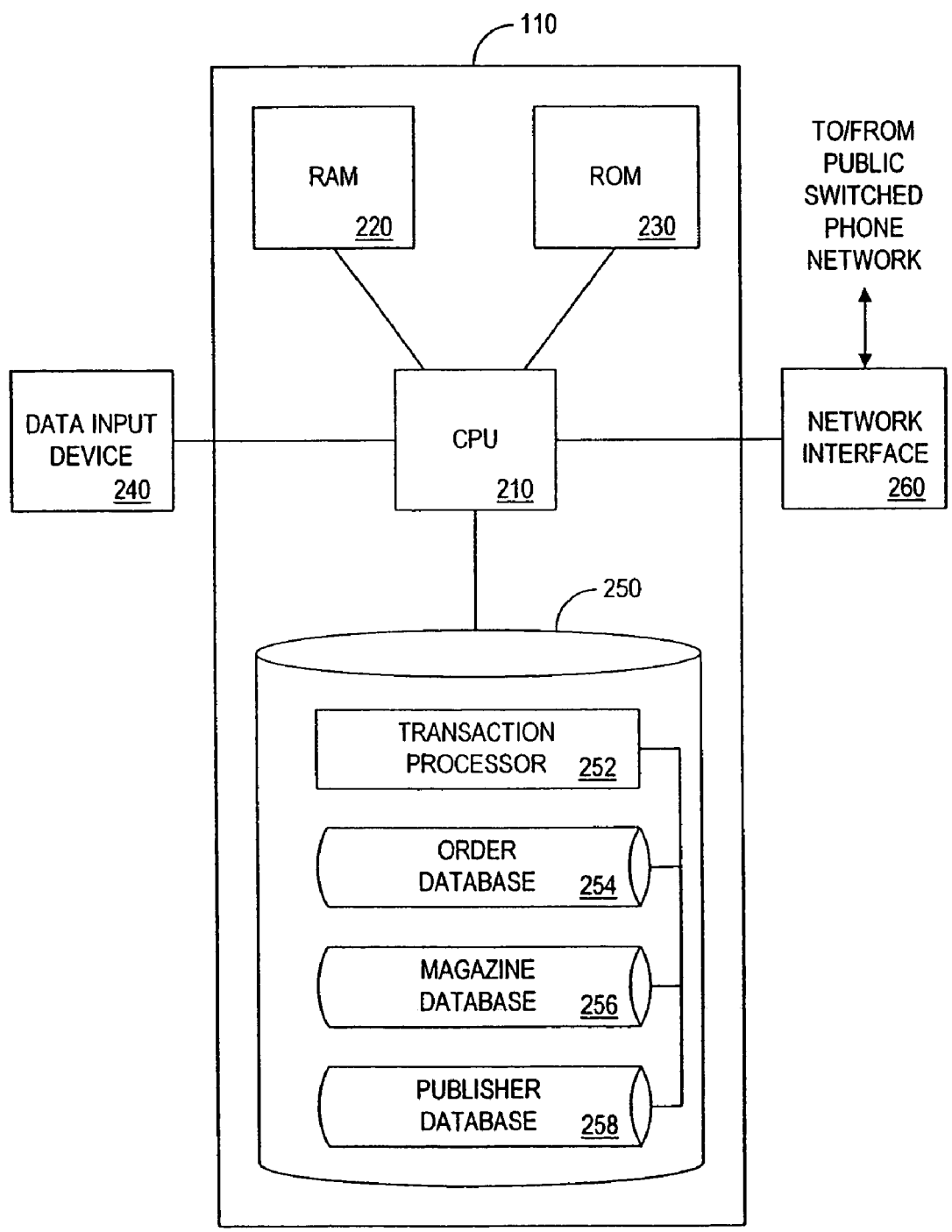
FIG. 2 illustrates a preferred embodiment of the central agent used in the system shown in FIG. 1.

FIG. 2 illustrates one embodiment of agent 110 used in the system shown in FIG. 1. As shown in FIG. 2, agent 110 includes central processing unit (CPU) 210, random access memory (RAM) 220, read-only memory (ROM) 230, at least one data input device 240, large capacity storage device 250, and network interface 260. CPU 210, preferably comprising a conventional microprocessor such as an Intel® Pentium® processor, is electronically coupled to each of agent 110's other elements.

CPU 210 executes program code (not shown) stored in one or more of RAM 220, ROM 230, and storage device 250 to carry out the functions and acts described in connection with agent 110. CPU 210 preferably comprises at least one high-speed digital data processor adequate to execute program modules for magazine ordering, subscriptions, continuous billing, and magazine order cancellation. These modules are described in connection with FIGS. 7-10B. CPU 210 interacts with RAM 220, ROM 230, and storage device 250 to execute stored program code according to conventional data processing techniques.

Data input device 240 permits operators at agent 110 to enter order data from customers 120. Device 240 preferably comprises digital data processing terminals configured to input order data that operators manually enter through, for example, a keyboard or mouse. Operators may obtain this data from paper forms filled out by customers 120 or from talking to the customers 120 via telephone. Alternatively, device 240 could also be configured to electronically scan forms filled out by customers 120. Device 240 transmits the entered data to CPU 210 for storage in storage device 250. In an alternative embodiment, data input device 240 could receive electronic transmissions representing order data from customers 120, in which case device 240 would be coupled to network interface 260. Although FIG. 2 shows agent 110 as containing only a single data input device 240, agent 110 could contain a combination of one or more data input devices of the different types described above.

Figure 6:
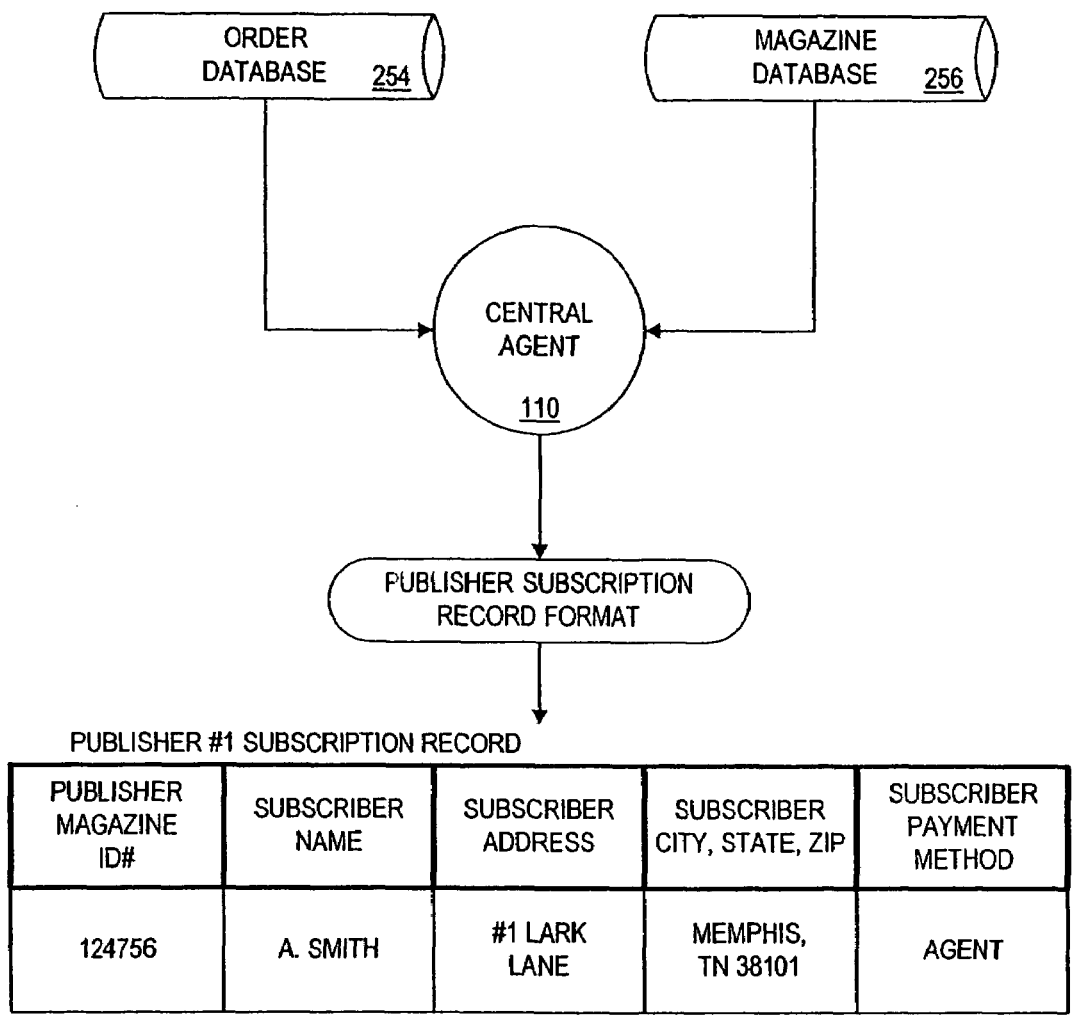
FIG. 6 illustrates a database conversion process executed by the system shown in FIG. 1.

Large capacity storage device 250 contains transaction processor 252, order database 254, magazine database 256, and publisher database 258. Transaction processor 252 maintains, calculates, and accesses data stored in the databases and generates publisher subscription and cancellation records, as described in connection with FIGS. 6-11B. Transaction processor 252 preferably encrypts financial or credit card data before transmission according to conventional encryption techniques. Transition processor 252 may comprise a separate, conventional CPU/microprocessor, or a portion of the operating function of CPU 210. Order database 254 contains data about customers 120 and which magazines they desire to subscribe to. Magazine database 256 contains information about each magazine, including its publisher, cost, and distribution frequency. Publisher database 258 contains information relating to magazine publishers, including which magazines each publishes and the data formats used to generate subscription and cancellation orders. Samples of the records and their respective fields contained in databases 252, 254, and 256 are shown in and described in connection with FIGS. 3-5. A representation of a database conversion for generating subscription records used by suppliers 130 is shown in FIG. 6.

Network interface 260 comprises a device for allowing agent 110 to communicate with other data terminals connected to the public switched phone network. Interface 260 preferably comprises a conventional high-speed modem employing known communication protocols capable of decrypting encrypted data received from the public switched phone network.

Database Formats

Samples of the contents of databases 254, 256, and 258 are shown in FIGS. 3-5. The specific data and fields illustrated in these figures represent only one embodiment of the records stored in the databases of the invention. In most cases, the fields shown in FIGS. 3-5 are relatively straight forward and self-explanatory. It is understood that the data and fields of these databases, as well as the number of databases, can be readily modified from the described embodiment and adapted to provide open-ended availability to commodity items, such as magazines, normally available to consumers only through renewable term-based subscriptions without undue experimentation.

Order database 254 essentially maintains a log of the magazines ordered by customers 120 and the payment method. FIG. 3 illustrates a sample of the contents of order database 254. As shown in FIG. 3, order database 254 contains order records having fields corresponding to, for example, order ID, customer information, date of order, credit card information, payment frequency, next payment date, magazine ID ordered, publisher term expiration date, status: active or canceled, and sale terms. The fields whose data is extracted directly from customer orders include customer information, date of order, credit card information, magazine ID ordered, and status. "Payment frequency" represents the duration between customer payments to agent 110 and is typically preselected by agent 110 or, in alternative embodiments, may be selected by the customer when completing the customer order. From this data and data stored in other databases, the data for the remaining fields can be calculated.

Magazine database 256 contains information about the magazines that are available through agent 110 on an open-ended basis. FIG. 4 illustrates a sample of the contents of magazine database 256. As shown in FIG. 4, database 256 contains magazine records having fields corresponding to, for example, magazine ID, magazine name, publisher ID, publisher term information, consumer rate for term, agent rate for term, and magazine distribution frequency. This information is provided and periodically updated by magazine publishers who have agreed to utilize agent 110 as their marketing and sales partner.

Publisher database 258 contains information about the magazine publishers. FIG. 5 illustrates a sample of the contents of publisher database 258. As shown in FIG. 5, publisher database 258 contains publisher records having fields corresponding to, for example, publisher ID, publisher name, publisher information, publisher subscription data format, list of magazine IDs published, and publisher cancellation data format. Publishers subscription data format and publisher cancellation data format are files describing the internal data formats that respective publishers use to process subscriptions and cancellations. Using these formats, agent 110 can transmit subscription and cancellation orders in the same unique format used internally by suppliers 130 themselves, thereby minimizing incompatibility problems. Like the data in magazine database 256, data in publisher database 258 is also provided and periodically updated by magazine publishers.

The use of data from order database 254 and magazine database 256 to generate publisher subscription records according to the publisher's unique format is represented in FIG. 6. Agent 110 uses order database 254 and magazine database 256 to generate publisher subscription records in accordance with the formats stored in publisher database 258. Agent 110 transmits these subscription records to respective suppliers 130 for their use. Agent 110 also generates publisher cancellation records in a similar manner to cancel subscriptions from suppliers 130.

Process

In providing open-ended availability to magazines normally available to consumers only through renewable term-based subscriptions, the system shown and described in connection with FIGS. 1 and 2 preferably executes several distinct modules, or processes. These processes include an ordering process, a conversion process, a subscription process, a continuous billing process, and a cancellation process. The steps associated with these processes are described in connection with FIGS. 7-11B and can be performed in any order, unless otherwise specified or dictated by the steps themselves. In alternative embodiments, these processes can be modified from what is described and adapted to provide open-ended availability to commodity items, such as magazines, normally available only through renewable term-based subscriptions.

Figure 7:
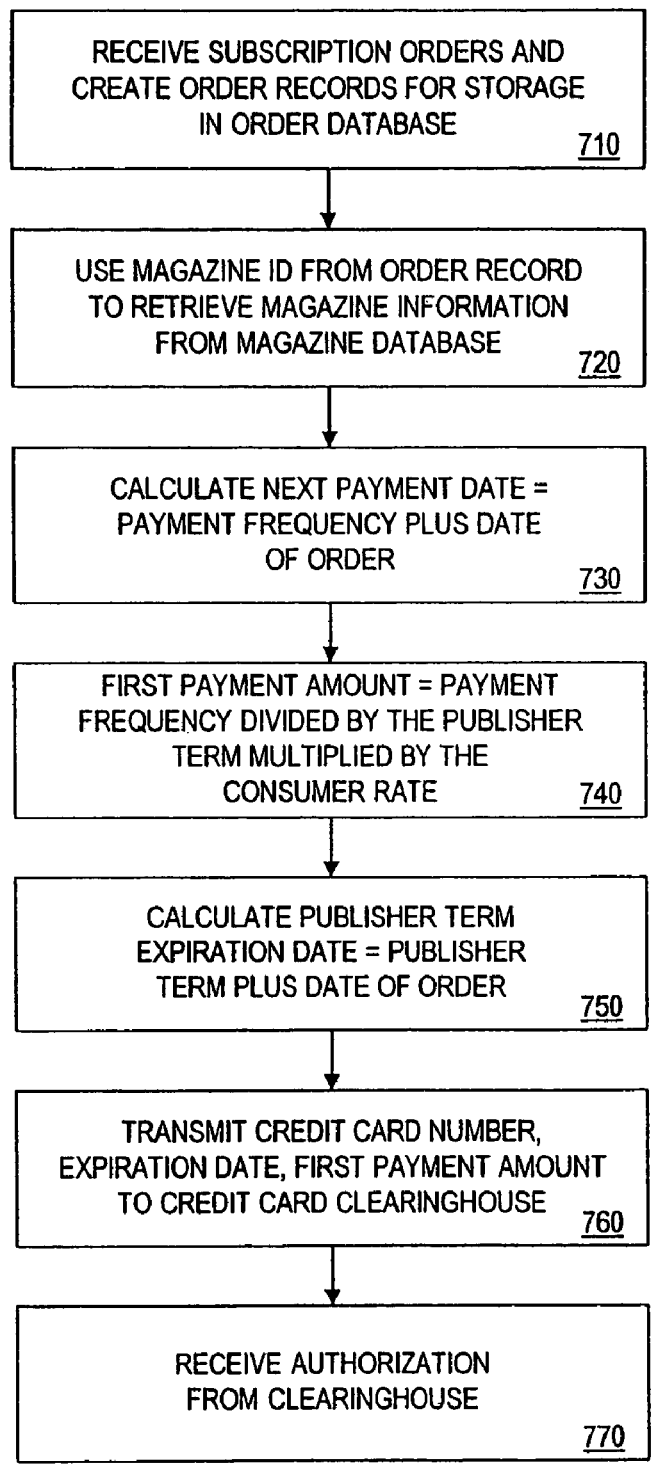
FIG. 7 illustrates an order process executed by the system shown in FIG. 1.

The ordering process involves a series of steps through which the system establishes data stored in order database 254. As shown in FIG. 7, operators at agent 110 receive subscription orders for magazine subscriptions from customers 120 (step 710). Agent 110 creates order records from the subscription orders for storage in order database 254 (step 710). The received subscription orders may comprise preprinted order forms from which customers 120 select or indicate which magazines they want to subscribe to on an open-ended basis. The forms contain the consumer rate at which respective magazines are available. Agent 130 agrees to notify customers 120 as soon as any changes to the customer rate occur. The data in these subscription orders includes magazine identification (ID) for each magazine to which customers 120 desire to subscribe and payment information, such as credit card number and expiration date. Using the magazine IDs contained in the subscription orders, agent 120 retrieves corresponding magazine information from magazine database 256 (step 720). This magazine information preferably includes publisher term information and consumer rate for term. Agent 110 calculates data for two of the remaining fields of order database 254, and the "first payment amount" field, as follows:

"next payment date" = payment frequency + date of order (step 730);

$$\text{"first payment amount"} = \frac{\text{payment frequency} * \text{consumer rate}}{\text{publisher term}} \text{(step 740);}$$

"publisher term expiration date" = publisher term + date of order (step 750).

By way of example, where the publisher term is twelve (12) months and the agent rate is $18 per year, and where the date of order is 1 Jan. 1997, payment frequency is quarterly (i.e. once every three (3) months), and consumer rate is $36 per year, the above fields can be calculated as follows:

"next payment date"=1 Jan. 1997+three (3) months 1 Apr. 1997

"first payment amount"=3*$36/12=$9

"publisher term expiration date"=twelve (12) months+1 Jan. 1997=31 Dec. 1997

Preferably, the system rounds off each month to constitute one 'unit' for purposes of calculations based on dates.

Data for the remaining fields represent either predetermined or constant information (e.g., payment frequency, status, sale terms) or information determined upon processing of the subscription order (e.g., order ID, date of order).

Agent 110 transmits the credit card number, expiration date, and first payment amount to clearinghouse 140 for authorization (step 760). Agent 110 receives authorization from clearinghouse 140 that the first payment amount was charged to the credit card (step 770).

Figure 8:
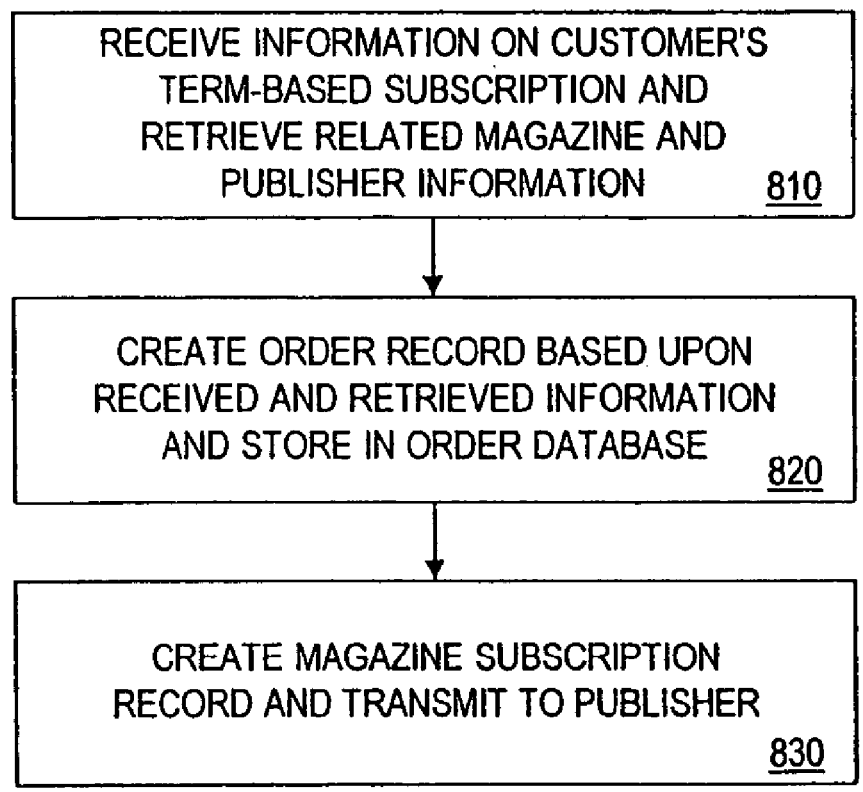
FIG. 8 illustrates a conversion process executed by the system shown in FIG. 1.

FIG. 8 illustrates a conversion process of the invention. In accordance with this conversion process, the system of the invention allows consumers to "convert" their term-based subscriptions into open-ended subscriptions. The system utilizes information related to the particular term-based subscription to retrieve information needed to perform the conversion. As shown in FIG. 8, the system receives information on the customer's term-based subscription (step 810). This information preferably includes the magazine title, customer information, and term expiration date. In one embodiment, the system receives the information from customer 120. Alternatively, the system may receive the information from supplier 130. The system uses this received information to retrieve related magazine from database 256 and publisher information from database 258 (step 810) and creates an order record (step 820). The system stores the order record in order database 254 (step 820).

The system creates a magazine subscription record and transmits the record to supplier 130 (magazine publisher) (step 830). This step is similar to steps 1055 and 1060 described in connection with FIG. 10B below. This magazine subscription record preferably instructs supplier 130 that agent 110 will assume continued payment of the subscription. This magazine subscription record also instructs supplier 130 to either suppress mailing of renewal notices or mail such notices to agent 110. Further, the magazine subscription record preferably includes the customer's name and address as recipient of the magazine so that the customer receives uninterrupted delivery of the magazine.

Figure 9:
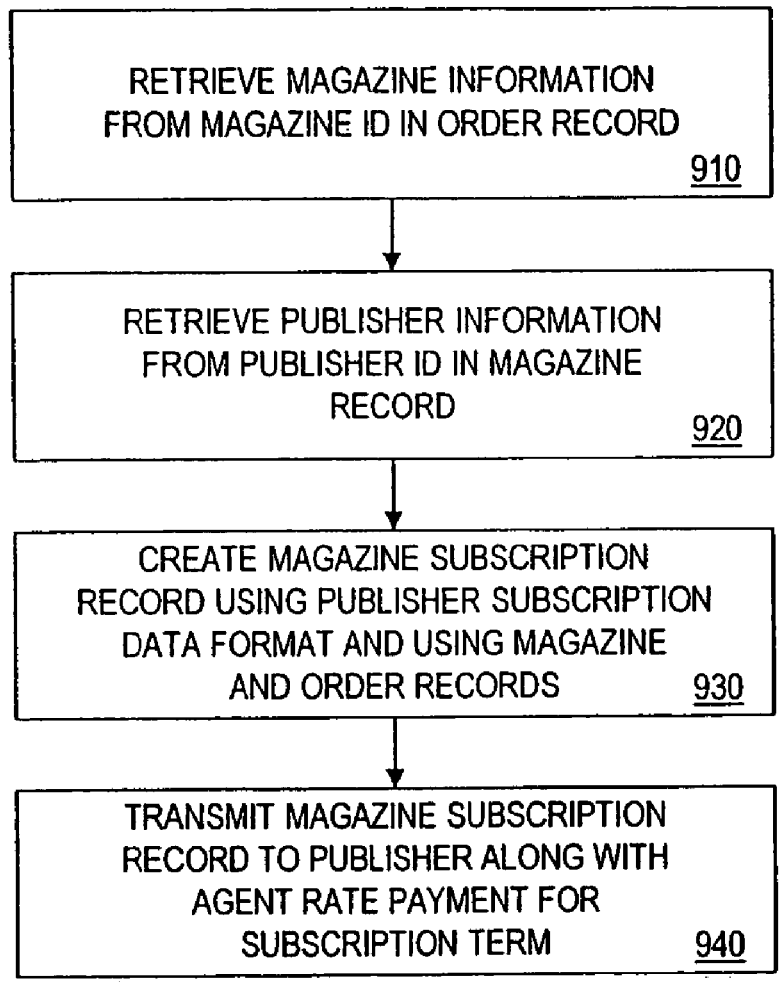
FIG. 9 illustrates a subscription process executed by the system shown in FIG. 1.

The subscription process involves a series of steps through which the system processes order records to generate publisher subscription records, which are transmitted to commodity suppliers 130 for their use in delivering magazines. As illustrated in FIG. 9, agent 110 extracts the magazine ID number from an order record and retrieves magazine information from magazine database 256 corresponding to that magazine ID number (step 910). Agent 110 extracts the publisher ID number from the extracted magazine information to retrieve publisher information from publisher database 258 (step 920). Agent 110 creates magazine subscription records in publisher subscription data format, as stored in database 258, and using order records stored in order database 254 and magazine records stored in magazine database 256 (step 930). This step is described in greater detail above in connection with FIG. 6. Agent 110 transmits the subscription records to supplier 130 (magazine publisher), along with agent rate payment for the subscription term (step 940). In this way, agent 110 pays supplier 130 for delivery of magazines for a full term based upon the less expensive agent rate, and receives payments from customers 120 once every payment frequency based upon the more expensive consumer rate.

Figure 10A:
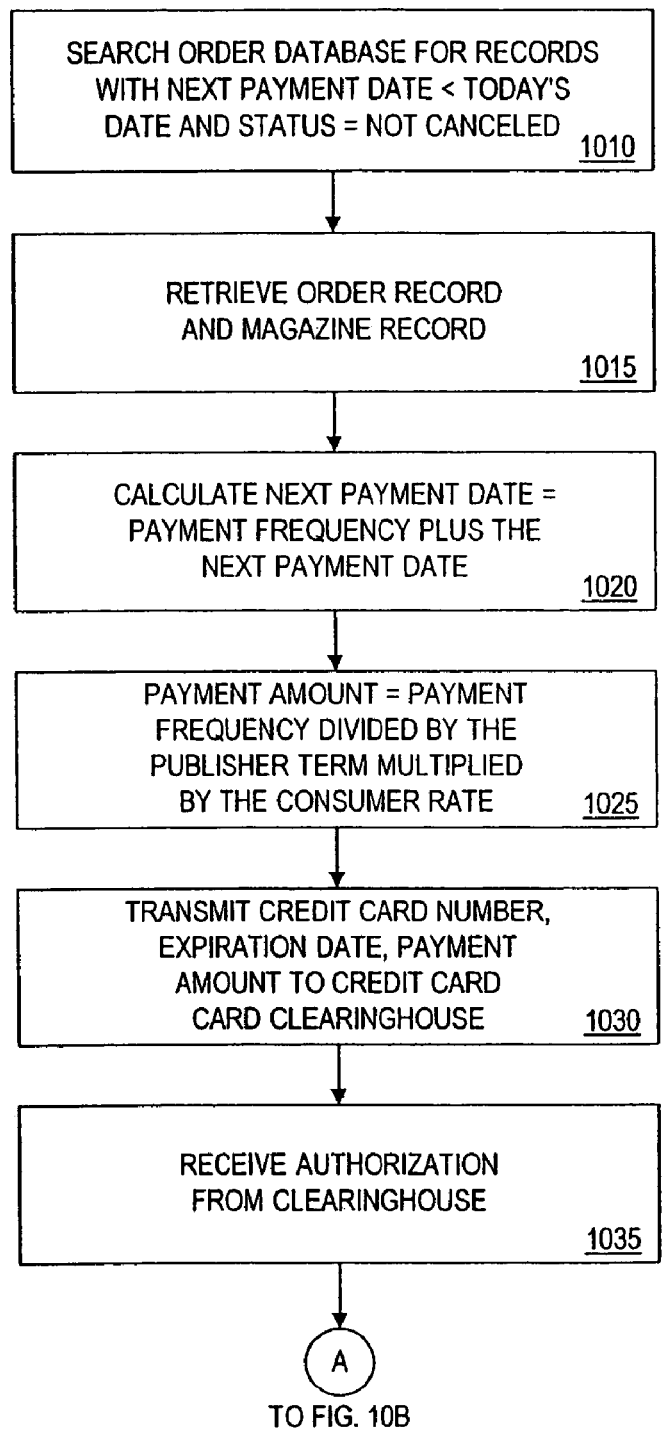
FIGS. 10A-10B illustrate a continuous billing process executed by the system shown in FIG. 1.

The billing process involves a series of steps through which the system determines whether any payment from customers is due and, if so, charges those payment amounts to customer credit cards. As shown in FIG. 10A, agent 110 searches order database 254 to identify any order records whose "next payment date" field contains a date less than (e.g., earlier than) today's date and whose status is not canceled (e.g., active) (step 1010). Agent 110 retrieves the identified order records and magazine records corresponding to the magazine IDs found in the identified order records (step 1015). Agent 110 recalculates several fields for the identified order records, including "next payment date," which is the sum of payment frequency and the previous date stored under the "next payment date" field (step 1020), and "payment amount," which is the payment frequency divided by the publisher term and multiplied by the consumer rate (step 1025). Following the example described above, the recalculations could be done as follows:

Where the recalculation is done on 2 Apr. 1997:

"next payment date"=three (3) months+1 Apr. 1997=1 Jul. 1997

"payment amount"=3*$36/12=$9

Agent 110 transmits credit card number, expiration date, and payment amount to clearinghouse 140 (step 1030) and receives authorization of the charge from clearinghouse 140 (step 1035). In this manner, the amount due is billed to the consumer in the next normal billing cycle of the customer's credit card.

Figure 10B:
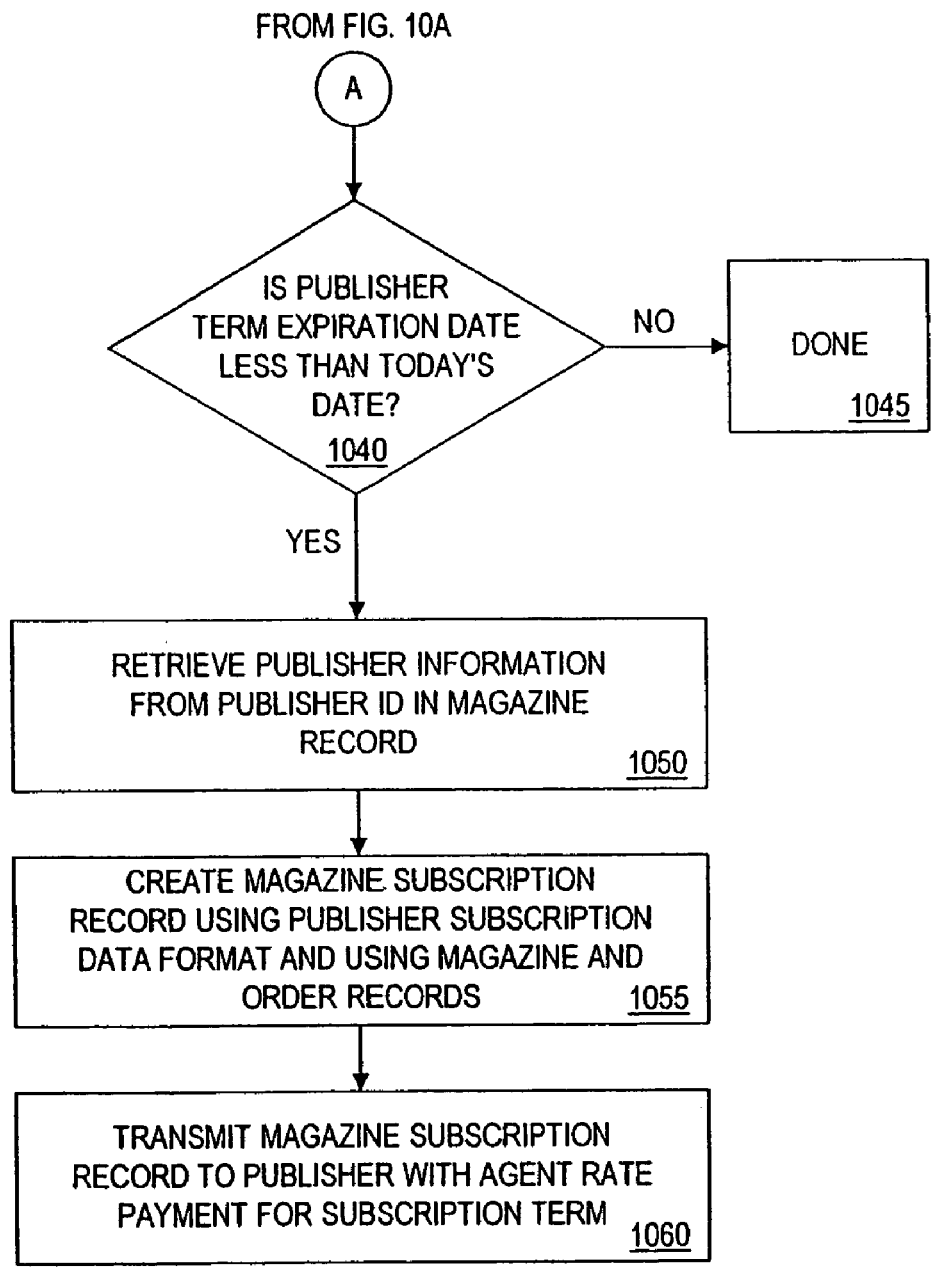

Agent 110 also determines whether the term for any paid subscriptions has expired and, if so, issues appropriate renewal instructions o the publisher. As illustrated in FIG. 10B, agent 110 determines whether the publisher term expiration date for each order record is less than (e.g., earlier than) today's date (step 1040). If no publisher term expiration dates are less than today's date, then no subscriptions need renewal (step 1045). If at least one publisher term expiration date is less than today's date, then agent 110 determines that those subscriptions need renewal and retrieves from publisher database 258 publisher information corresponding to the publisher ID of each subscription requiring renewal (step 1050). Agent 110 creates a new magazine subscription record using the appropriate publisher subscription data format and using appropriate magazine and order records (step 1055). Agent 110 transmits the new magazine subscription record, along with payment based upon the agent rate, to the appropriate supplier 130 (step 1060).

Figure 11A:
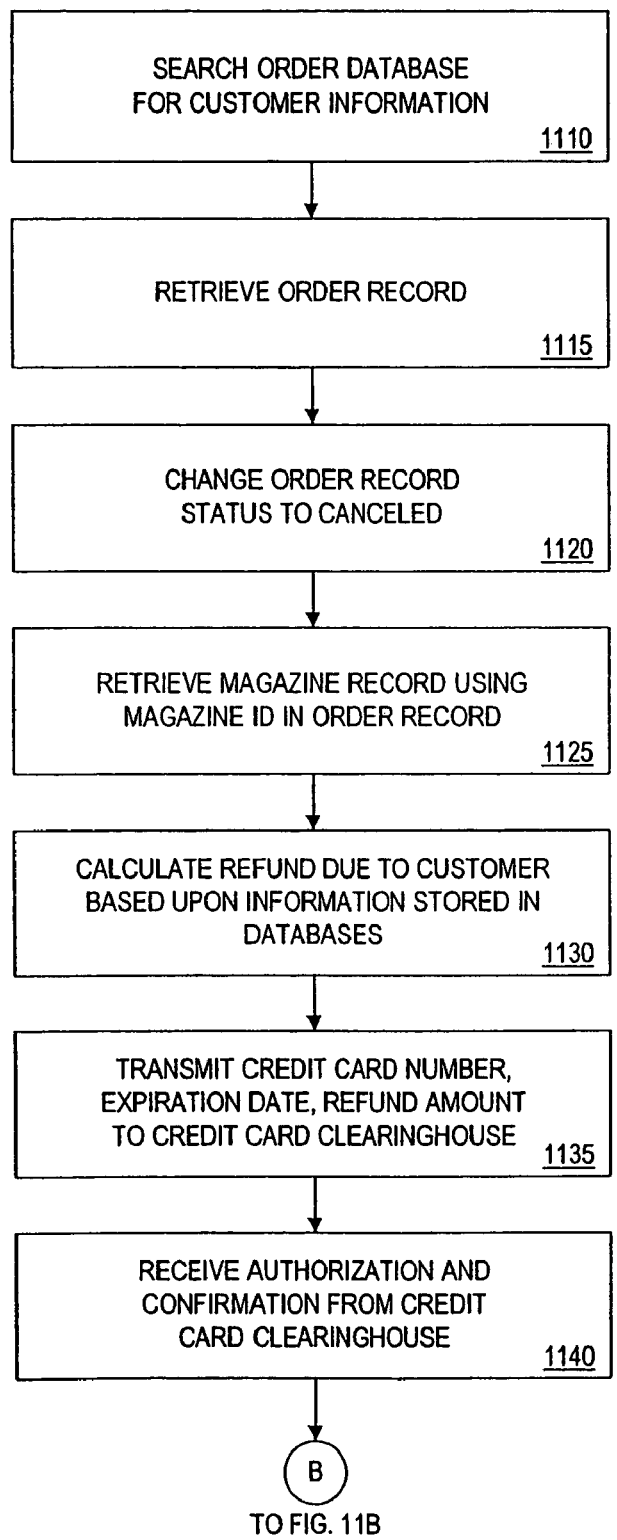
FIGS. 11A-11B illustrate a continuous billing process executed by the system shown in FIG. 1.

The cancellation process involves updating order records to reflect cancellation orders from customers 120. Since customer subscriptions are provided on an open-ended basis, customers can notify agent 110 at any time that they would like their subscriptions canceled. With reference to FIG. 11A, upon receiving cancellation orders, agent 110 searches order database 254 for customer information matching that of the customer who canceled his subscription (step 1110). Agent 110 retrieves the order record (step 1115) and changes the order record status to "canceled" (step 1120). Agent 110 uses the magazine ID in the retrieved order record to retrieve the magazine record corresponding to the canceled subscription (step 1125) and calculates the refund amount that agent 110 owes the customer for prepaid, but undelivered magazine issues (step 1130). This refund amount is calculated based upon information stored in account records and magazine records, including sales terms, next payment date, today's date, payment frequency, and customer rate. If the sales terms provide for full refunds to customers 120, agent 110 calculates the refund amount as follows:

$$\text{refund amount to customer} = \frac{(\text{next payment date} - \text{today's date}) * \text{customer payment amt}}{\text{payment frequency}}$$

Agent 110 transmits the credit card-number, expiration date, and refund amount to clearinghouse 140 (step 1135) and receives authorization and confirmation from clearinghouse 140 that the credit card was credited (step 1140).

Figure 11B:
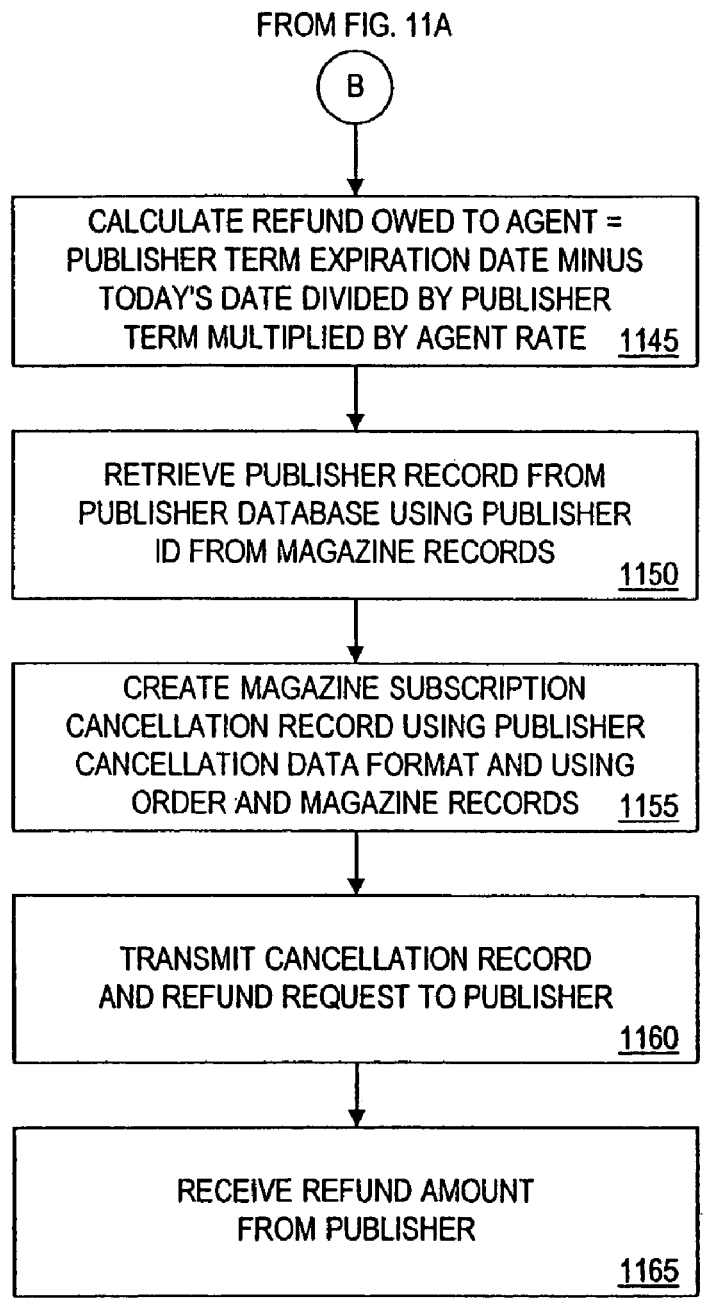

In addition to modifying its own records and issuing refunds to customers 120, as illustrated in FIG. 11B, agent 110 generates cancellation records for suppliers 130 and calculates the refund suppliers 130 owe to agent 110 (step 1145). The refund amount from supplier 130 to agent 110 is calculated as follows:

$$\text{refund amount to agent} = \frac{(\text{publisher term expiration date} - \text{today's date})}{\text{publisher term}} * \text{agent rate}$$

Continuing the example described above, the cancellation refunds are calculated as follows:

Where the cancellation occurs on 1 Aug. 1997:

"refund amount to customer"=(1 Oct. 1997-1 Aug. 1997)*$9/3=2*$9/3$6

"refund amount to agent"=(31 Dec. 1997-1 Aug. 1997)*$18/12=5*$18/12=$7.50

Thus it will be appreciated that, since the customer is paying quarterly on an open-ended basis, and has canceled one-third of the way through a quarter, he receives a refund of two-thirds of his quarterly payment. Since the agent has prepaid the entire term to the publisher, and has received the benefit of seven months of the 12 month subscription term, he receives a refund for the balance of the year, or five-twelfths of his agent's cost.

Agent 110 uses publisher IDs from magazine records of the canceled subscriptions to retrieve publisher cancellation data format (step 1150). Agent 110 creates a cancellation record using the publisher cancellation data format and using order and magazine records corresponding to the canceled subscription (step 1155) and transmits to supplier 130 the cancellation record and a request for the calculated refund amount owed to agent 110 (step 1160). Agent 110 receives the refunded amount from supplier 130 (step 1165).

Special Service Features

It will be appreciated that the system and method of the present invention permits many special services to be provided to customer 120 by the agent. For example, the system of the invention can provide the ability to synchronize payment dates of multiple open-ended subscriptions, and the ability to easily start and stop service.

In order to synchronize the payments of multiple open-ended subscriptions, order database 254 is periodically reviewed to identify multiple subscriptions, as evidenced by order ID's having similar customer information. The payment frequency and next payment date of the multiple subscriptions are reviewed, and an appropriate consolidation is made, for example, by changing the payment frequency and date for multiple subscriptions to a selected single frequency and date. This change is preferably done in consultation with customer 120, to make billing and service more convenient for the customer.

Similarly, the system can readily provide other payment schedules tailored to individual customers. For example, a customer may choose to have an expensive subscription cost billed over multiple time periods, while an inexpensive subscription cost can be billed as a single unit, or even grouped and billed with other inexpensive subscription costs.

Starts and stops, for example to accommodate extended vacations, can be supported responsive to requests from customer 120 by initiating appropriate cancellation and subscription requests in the manner described above. Due to lead times currently required by supplier/publisher 130 to cancel ad initiate subscriptions, such starts and stops are only practical for extended periods of stop time. However, as processes of distribution improve in efficiency, such starts and stops may be practical for decreasing stop times.

CONCLUSION

The system of the invention provides open-ended availability to commodity items, such as magazines, normally available to consumers only through renewable term-based subscriptions. Such open-ended subscriptions eliminate the drawbacks associated with term-based subscriptions.

It will be apparent to those skilled in the art that various modifications and variations can be made in the system and processes of the present invention without departing from the spirit or scope of the invention. Thus, it is intended that the present invention cover the modifications and variations of this invention provided they come within the scope of the appended claims and their equivalents. In this context, equivalents means each and every implementation for carrying out the functions recited in the claims, even if not explicitly described herein.

The invention claimed is:

1. A system for managing subscriptions to commodity items normally available through renewable term-based subscriptions, comprising:
   means for receiving customer orders for open-ended subscriptions to said commodity items, said open-ended subscriptions expiring only upon request of respective customers, each customer order including an indication of one of the group comprising a credit card and a bank account for paying a charge for the open-ended subscription;
   means for storing said received customer orders;
   means for receiving from suppliers subscription information for said commodity items;
   means for storing said subscription information;
   means for using the customer orders and the subscription information to generate supplier orders for renewable term subscriptions to said commodity items; and
   means for communicating said supplier orders to respective suppliers of said commodity items.

2. The system of claim 1 wherein said communicating means further includes means for periodically communicating renewal supplier orders to said respective suppliers of said commodity items.

3. The system of claim 1 wherein said commodity items comprise magazines and said subscription information includes a publisher identifier, a magazine identifier, and a term.

4. A system as recited in claim 1, wherein the means for storing subscription information includes a first database for storing the subscription information for the commodity items supplied on a renewable tern basis, said subscription information including
   an identifier for a supplier,
   an identifier for said commodity items,
   a subscription term for said commodity items, and
   an agent cost for said commodity items; and
   wherein the means for storing said received customer orders includes a second database for storing customer order information associated with the customer orders for open-ended subscriptions to said commodity items, said customer order information including
   an identifier for a customer,
   an identifier for said commodity items,
   an order date,
   a billing period,
   a customer cost, and
   a billing account including a selected one of a credit card identifier and a bank account identifier.

5. A system as recited in claim 4, further comprising means for requesting suppression of renewal notices for a commodity item subscription from a supplier to a customer.

6. A system as recited in claim 1, wherein the means for storing subscription information includes a first database for storing the subscription information for said commodity items supplied by a plurality of suppliers on a renewable term basis, said subscription information including
   an identifier for a supplier,
   an identifier for said commodity items,
   a subscription tern for said commodity items, and
   an agent cost for said commodity items;
   wherein the means for storing said received customer orders includes a second database for storing customer order information associated with the customer orders for open-ended subscriptions to said commodity items, said customer order information including an identifier for a customer,
an identifier for said commodity items,
an order date,
a billing period,
a customer cost, and
a billing account including a selected one of a credit card identifier and a bank account identifier; and
wherein the means for using the customer orders and the subscription information to generate supplier orders includes means for selecting subscription information stored in said first database, means for selecting customer order information stored in said second database, and means for generating a supplier order for a renewable term subscription to said commodity items using the selected subscription information and the selected customer order information.

7. A system as recited in claim 6, further comprising means for requesting suppression of renewal notices for a commodity item subscription from a supplier to a customer.

* * * * *